(12) United States Patent
Akutsu et al.

(10) Patent No.: US 8,284,937 B2
(45) Date of Patent: *Oct. 9, 2012

(54) METHOD FOR SYNCHRONIZATION IN ENCRYPTED COMMUNICATIONS USING SHARED KEY

(75) Inventors: Shigeto Akutsu, Yokohama (JP);
Katsuyoshi Harasawa, Ninomiya (JP);
Makoto Honda, Odawara (JP); Takeshi Hosoi, Yokohama (JP)

(73) Assignee: Hitachi Information & Communication Engineering, Ltd., Kanagawa (JP)

( * ) Notice: Subject to any disclaimer, the term of this patent is extended or adjusted under 35 U.S.C. 154(b) by 1183 days.

This patent is subject to a terminal disclaimer.

(21) Appl. No.: 11/693,804

(22) Filed: Mar. 30, 2007

(65) Prior Publication Data
US 2007/0234051 A1 Oct. 4, 2007

(30) Foreign Application Priority Data

Mar. 31, 2006 (JP) ................................ 2006-096818

(51) Int. Cl.
*H04K 1/00* (2006.01)
*H04L 9/00* (2006.01)

(52) U.S. Cl. ........ 380/255; 380/256; 380/260; 380/261; 380/277; 380/278; 375/149; 375/329; 375/355; 713/168; 713/400

(58) Field of Classification Search .................. 713/168, 713/400; 380/255, 278, 256, 277, 260, 261; 375/144, 149, 329, 355, 356
See application file for complete search history.

(56) References Cited

U.S. PATENT DOCUMENTS

| | | | | |
|---|---|---|---|---|
| 5,757,912 A | * | 5/1998 | Blow | 380/256 |
| 6,438,234 B1 | * | 8/2002 | Gisin et al. | 380/256 |
| 6,895,092 B2 | * | 5/2005 | Tomita | 380/278 |
| 6,897,434 B1 | * | 5/2005 | Kumar et al. | 250/227.18 |
| 7,333,611 B1 | * | 2/2008 | Yuen et al. | 380/256 |
| 7,581,017 B2 | * | 8/2009 | Hattori | 709/232 |
| 7,639,947 B2 | * | 12/2009 | Luo et al. | 398/89 |
| 7,697,687 B2 | * | 4/2010 | Liang et al. | 380/255 |
| 2001/0038695 A1 | * | 11/2001 | Kim | 380/283 |

(Continued)

OTHER PUBLICATIONS

Kyo Inoue, Quantum Key Distribution Technologies, pp. 1-9, IEEE 2006.*

(Continued)

*Primary Examiner* — Philip Chea
*Assistant Examiner* — Shanto M Abedin
(74) *Attorney, Agent, or Firm* — Brundidge & Stanger, P.C.

(57) ABSTRACT

The disclosed is a method for synchronization of the running key that is generated from a shared key and that is used for encryption and decryption in communications encrypted with the shared key using a multi-valued signal. In the method for synchronization, the transmitting node transmits a signal that is formed of a multi-valued signal and that has a predetermined fixed pattern before transmitting data encrypted with the shared key. The receiving node generates a bit discrimination threshold signal that allows for bit discrimination and that has a fixed length, shifts bit by bit the phase of the bit discrimination threshold signal while monitoring bit discrimination with respect to a fixed pattern signal that is to be received, and sets the phase of the bit discrimination threshold signal when the phase of the fixed pattern signal matches the phase of the bit discrimination threshold signal. Then, synchronization of the running key is performed in accordance with the phase that has been set between the transmitting node and the receiving node.

15 Claims, 6 Drawing Sheets

U.S. PATENT DOCUMENTS

| | | | |
|---|---|---|---|
| 2002/0025041 A1* | 2/2002 | Tomita | 380/256 |
| 2005/0141716 A1* | 6/2005 | Kumar et al. | 380/255 |
| 2005/0152540 A1* | 7/2005 | Barbosa | 380/28 |
| 2005/0180575 A1* | 8/2005 | Maeda et al. | 380/278 |
| 2006/0067533 A1* | 3/2006 | Yanovsky | 380/278 |
| 2007/0058810 A1* | 3/2007 | Tanaka et al. | 380/210 |
| 2007/0255679 A1* | 11/2007 | Hosoi et al. | 707/1 |
| 2008/0101607 A1* | 5/2008 | Liang et al. | 380/260 |

OTHER PUBLICATIONS

Richard J. Hughes et al, Quantum key distribution over a 48km optical fibre network, pp. 1-15, Taylor & Francis Ltd. 2000.*

Horace P. Yuen, KCQ: A new approach to quantum cryptography, pp. 1-26, Department of physics and astronomy, Northwestern University, IL, 2004.*

Geraldo A. Barbosa et al, Secure Communication using mesoscopic coherent states, pp. 1-4, The American Physical Society, 2003.*

Osamu Hirota et al, Quantum stream cipher based on optical communications, pp. 206-219, SPIE, Jul. 2004.*

"Secure Communication Using Mesoscopic Coherent States" by Barbosa, et al., rev. 2003.

"Quantum Stream Cipher Based on Optical Communications", Osamu Hirota, et al., 2004.

"Quantum Cryptography, Public Key Distribution and Coin Tossing" by Charles Bennett, et al., International Conference on Computers, Systems & Signal Processing, Bangalore, India, Dec. 1984., pp. 175-179.

* cited by examiner

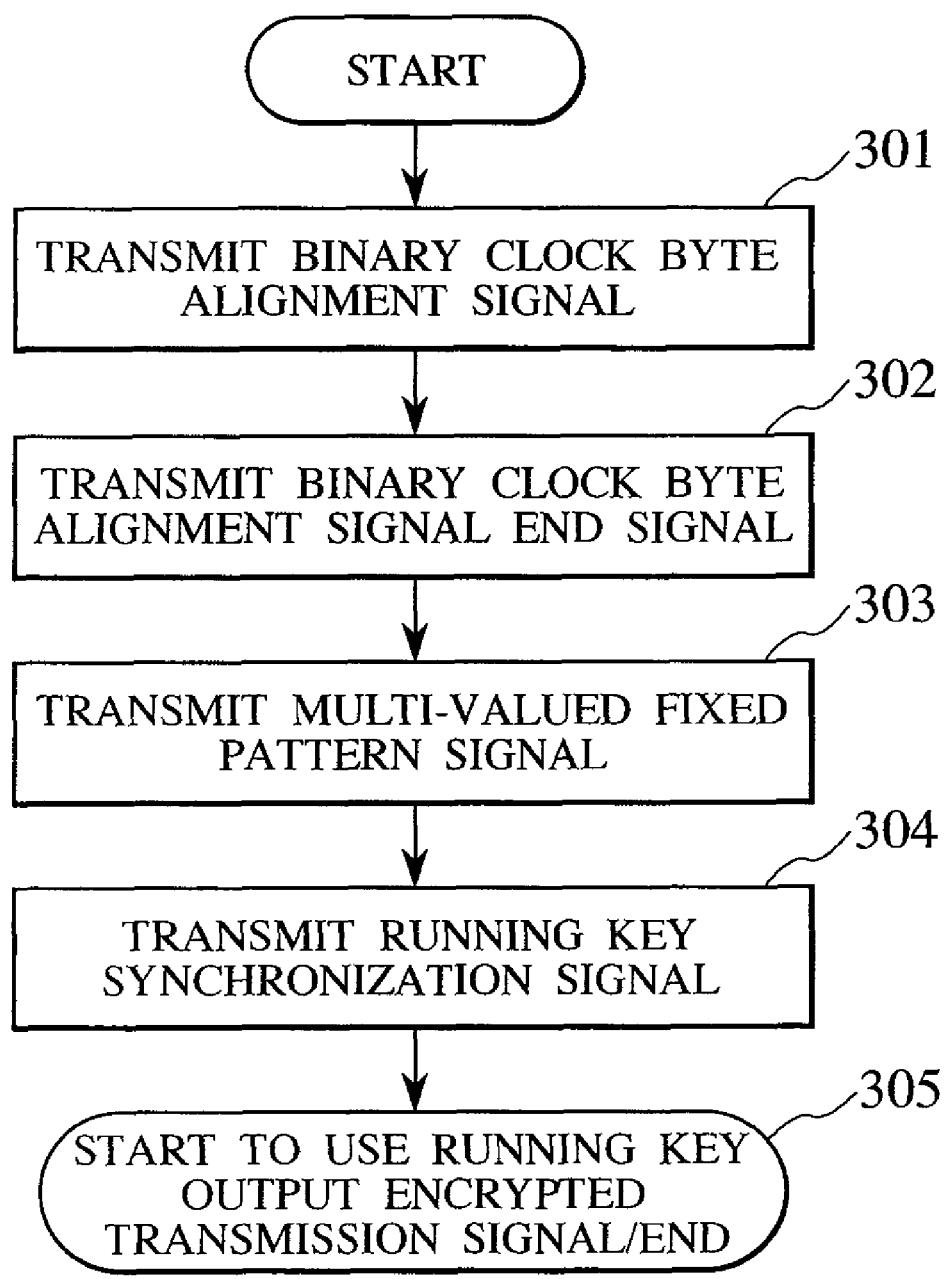

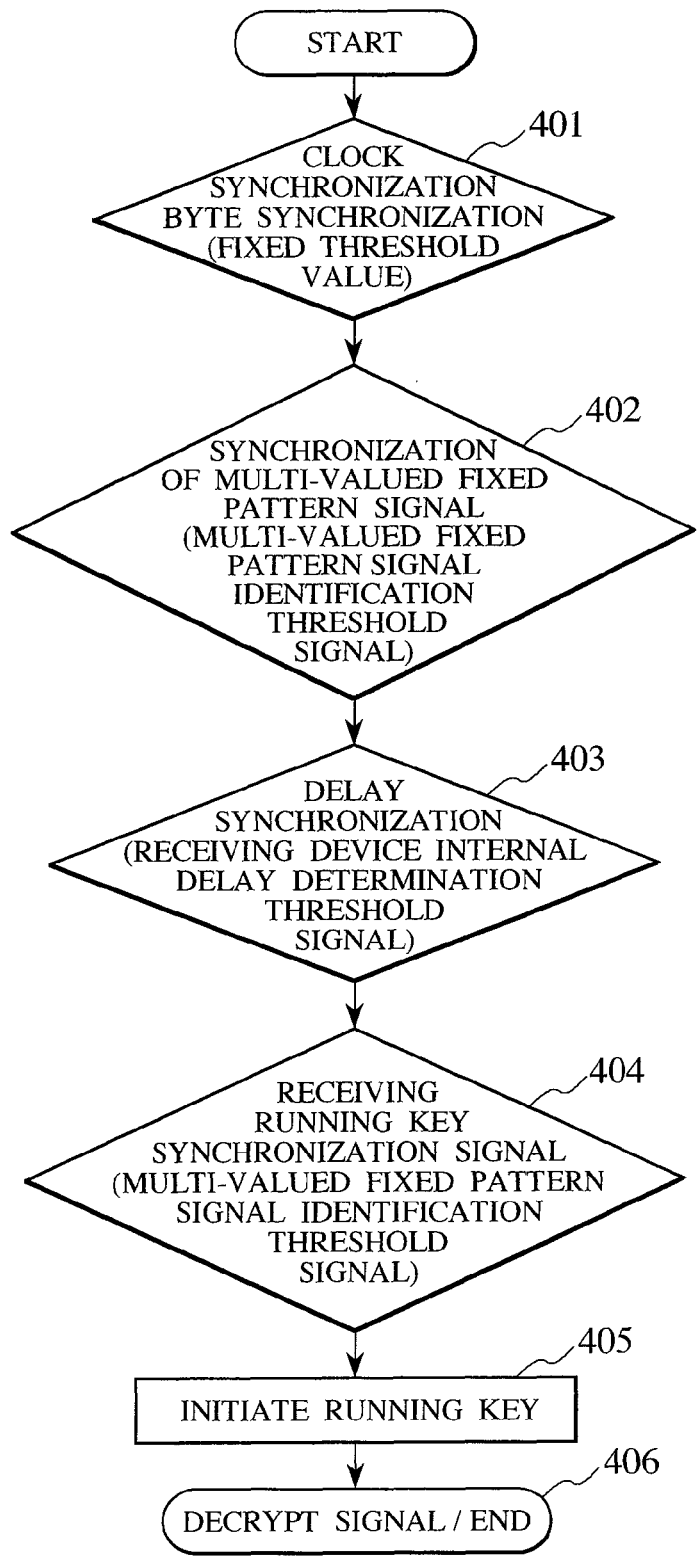

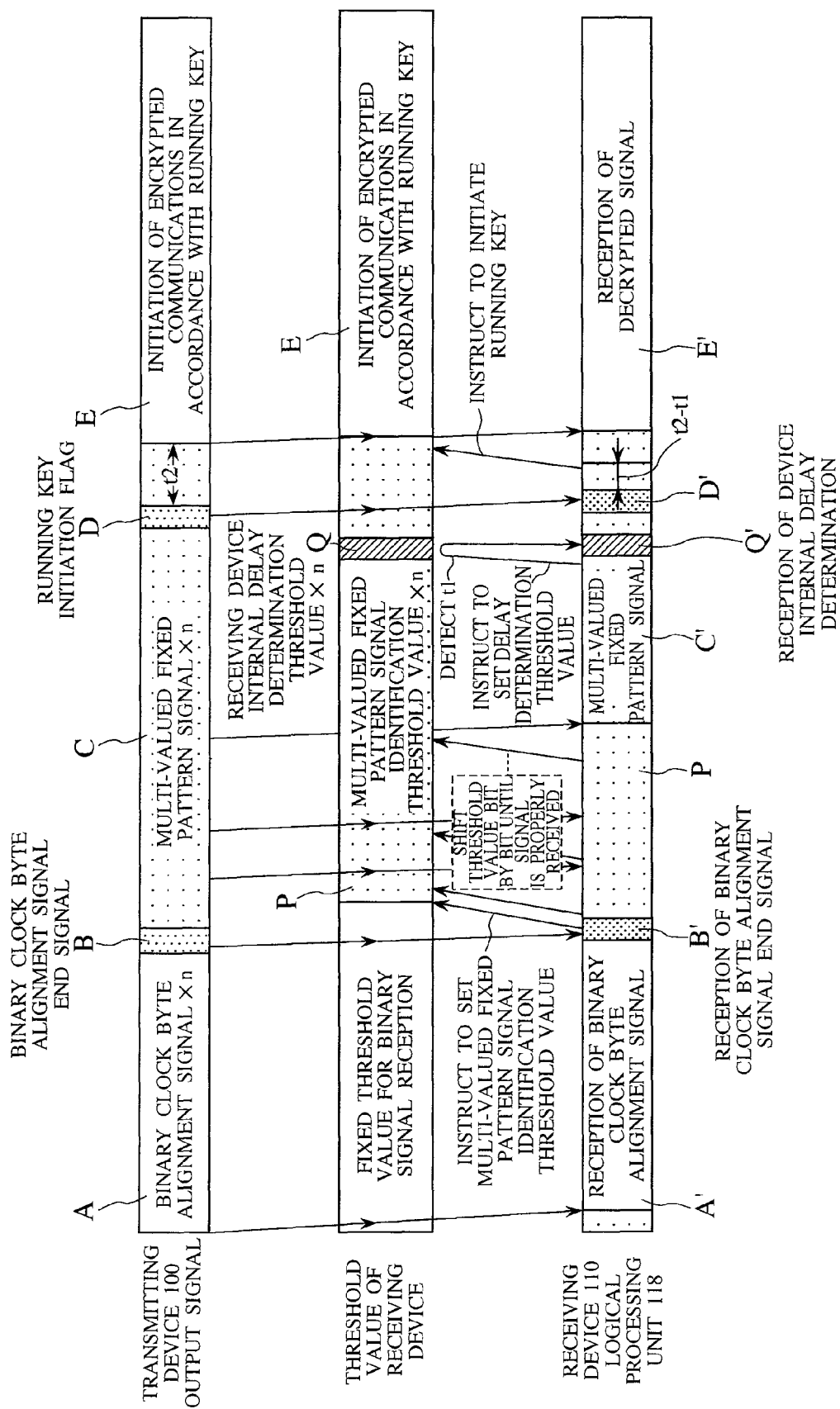

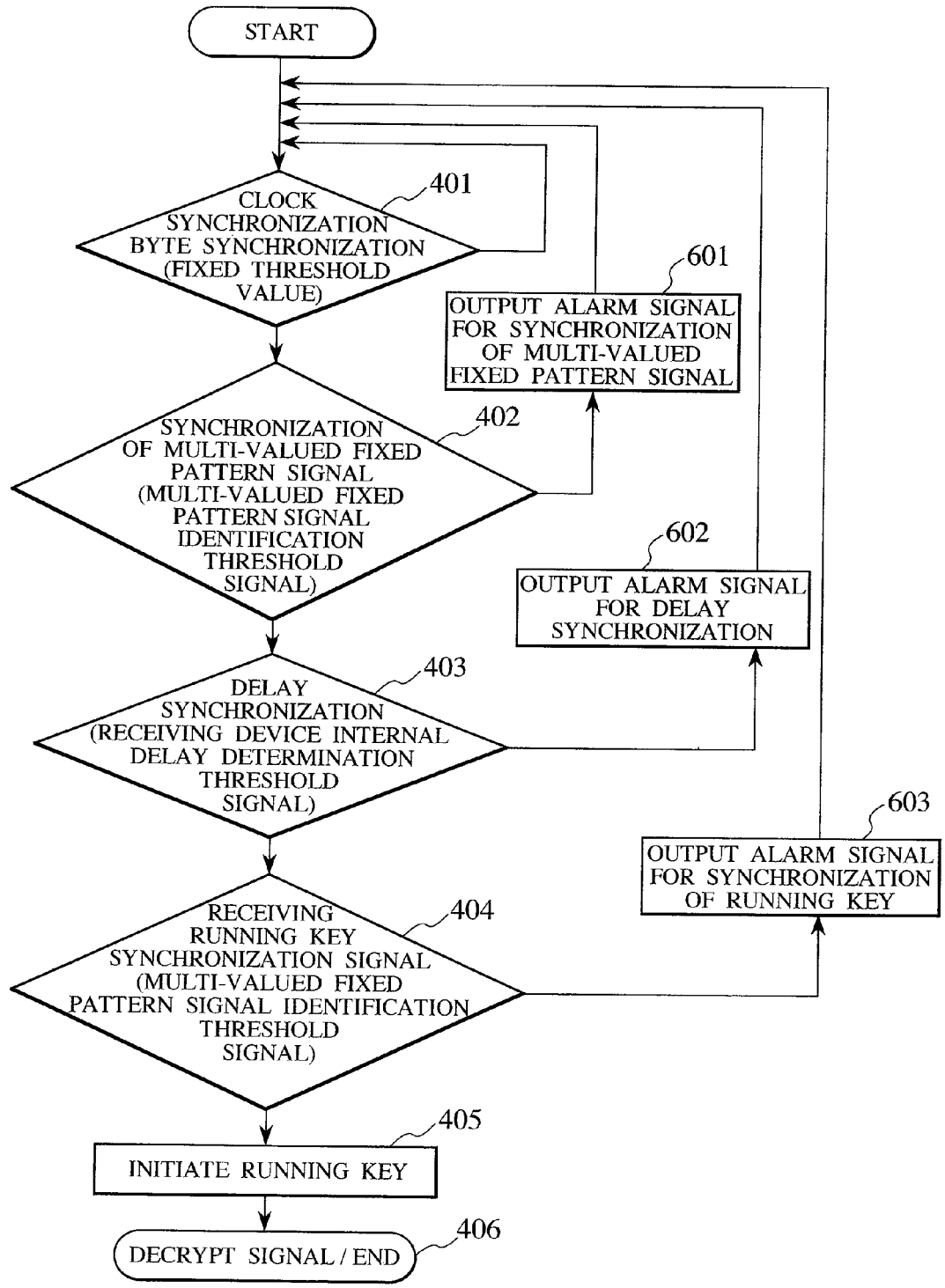

METHOD FOR SYNCHRONIZATION IN ENCRYPTED COMMUNICATIONS USING SHARED KEY

BACKGROUND OF THE INVENTION

1. Field of the Invention

The present invention relates generally to a method for synchronization in encrypted communications using a shared key. More particularly, the invention relates to a technique for synchronization of a running key used for encryption and decryption between a transmitting node and a receiving node when communicating data encrypted with a shared key using a multi-valued signal for quantum cryptographic transmission in optical communications, and relates to a method for encrypted communications using the technique, a system for the technique, and a receiving device used in the system.

2. Description of the Related Art

In communication technologies, a communication signal is generally encrypted. For the encryption, there are two known encryption schemes: a software encryption (mathematical encryption) scheme using a mathematical analysis technique; and a physical encryption scheme using physical effects of a signaling system.

The software encryption scheme provides a lot of combinations of codes so as to ensure difficulty in deciphering them. However, data encrypted by using the software encryption scheme can be in principle deciphered by matching using all possible combinations of codes (brute force key search attacks). In contrast, the purpose of the physical encryption scheme is to prevent data from being deciphered in principle. A quantum encryption scheme, which has been under development in recent years, is of the type of the latter.

As disclosed in Document 1 (C. H. Bennett and G. Brassard, "Quantum cryptography," in Proc. IEEE, Int. Conf, on Computers system, and signal processing, p. 175, (1984)), a secret key distribution protocol (BB-84) proposed by C. H. Bennett and G. Brassard in 1984 is known as a quantum encryption scheme. Document 1 has proposed that a distribution of a large amount of keys required for the one time pad scheme be achieved using a technique for quantum communications.

In addition, another quantum encryption scheme, a shared key quantum encryption scheme has been under development, in which quantum fluctuations (quantum shot noise) of light are spread by modulation so that an eavesdropper cannot properly receive an optical signal and that data cannot be deciphered even by infinite computational power. The shared key quantum encryption scheme is designed so that a binary optical signal carrying data to be transmitted in a binary code is regarded as one set (which is called a basis), and that an M number of bases is prepared, and that a basis used to transmit data is randomly determined among the bases based on a pseudo-random number generated in accordance with an encryption key. Practically, a multi-valued optical signal is designed such that an inter-signal distance is small enough to prevent data identification due to quantum fluctuations. Thus, with the shared key quantum encryption scheme, the eavesdropper cannot decipher data information from a received signal.

Optical modulation/demodulation devices used in the legitimate transmitting and receiving nodes operate to communicate data while changing the M number of the binary bases in accordance with common pseudo-random numbers. Thus, the legitimate receiving node can read data by detecting a binary signal having a large inter-signal distance. As a result, an error due to quantum fluctuations can be ignored, whereby the shared key encryption scheme makes it possible to provide appropriate communications.

The encryption scheme based on the abovementioned principle is called Yuen quantum cryptography, which is based on Yuen-2000 cryptographic communication protocol (or ALPHA-ETA protocol in US, abbreviated to Y-00 Protocol). Northwestern University where P. Kumar, H. Yuen, et al. are enrolled has disclosed an optical phase modulation technique, which is a communication scheme that allows for the Y-00 Protocol, in Document 2 (G. A. Barbosa, E. Corndorf, P. Kumar, H. P. Yuen, "Secure communication using mesoscopic coherent state," Phys. Rev. Lett. Vol-90, 227901, (2003)). In addition, a group of Tamagawa University has disclosed an optical intensity modulation technique in Document 3 (O. Hirota, K. Kato, M. Sohma, T. Usuda, K. Harasawa, "Quantum stream cipher based on optical communication" SPIE Proc. on Quantum Communications and Quantum Imaging vol-5551, (2004)).

It should be noted that the Y-00 Protocol can provide higher cryptographic strength in, e.g., radio communications and electrical communications in which quantum fluctuations are not used (called classical Y-00 Protocol), as compared with typical stream encryption schemes.

SUMMARY OF THE INVENTION

In encrypted communications using a shared key, the software encryption scheme is designed to store, in a memory, data that has been encrypted and transmitted and to sequentially decrypt the data by performing computational processing. For transmission with a quantum encryption scheme in optical communications, however, the data that has been encrypted and transmitted is physically encrypted. Thus the transmitted signal cannot be stored directly in the memory. In other words, it is necessary that the transmitted data be directly decrypted without being stored in the memory. The transmitted data varies in optical intensity basis based on a running key. Thus, when a receiving device performs processing for bit discrimination, it is required that a threshold value (bit discrimination threshold value) for the bit discrimination be controlled in accordance with the running key. At this time, the bit discrimination threshold value generated in the receiving device needs to be synchronized in timing with the data that has been encrypted and transmitted.

Therefore, an object of the present invention is to provide a method for synchronization of a running key used for encryption and decryption between a transmitting node and a receiving node so as to achieve encrypted communications using a shared key, and provide a system for the method and a receiving device used in the system.

The method for synchronization according to the present invention is to perform synchronization of a running key used for encryption and decryption between a transmitting node and a receiving node, the running key being generated from the shared key in encrypted communications with the shared key using a multi-valued signal. In the method for synchronization, before the transmitting node transmits data encrypted by using the shared key, the transmitting node and the receiving node perform the following operations. That is, the transmitting node transmits a signal that is formed of a multi-valued signal and that has a predetermined fixed pattern. The receiving node generates a threshold signal (hereinafter referred to as a bit discrimination threshold signal) that allows for bit discrimination and that has a fixed length. Then, the receiving node shifts bit by bit the phase of the bit discrimination threshold signal while monitoring the bit discrimination with respect to the signal that has the predetermined fixed pattern and that is to be received. When the phase of the signal that has the predetermined fixed pattern and that is to be received matches the phase of the bit discrimination threshold signal, the phase of the bit discrimination threshold signal is set in the receiving node. In accordance with the phase that has been set, the synchronization of the running key is performed between the transmitting node and the receiving node.

In a preferable embodiment of the present invention, the transmitting node repeatedly transmits the signal that has the predetermined fixed pattern a plurality of times, and the receiving node performs bit discrimination while sequentially shifting bit by bit a plurality of the signals that have been received and that each have the predetermined fixed pattern.

In another preferable embodiment of the present invention, the receiving node changes a part of the phase of the bit discrimination threshold signal while monitoring the change of the bit discrimination threshold signal during the reception of the signals that each have the predetermined fixed pattern and that have been repeatedly transmitted. In accordance with a result of the monitoring, an amount of delay of the bit discrimination threshold signal that has been generated in the transmitting node is set. Accordingly, the synchronization of the running key is performed along with the reception of the shared key.

In still another preferable embodiment of the present invention, the following operations are performed with a method for encrypted communications with the shared key using a multi-valued signal. That is, the transmitting node transmits a flag signal (running key synchronization signal) to inform the receiving node of the position of the running key used for encrypted communications before a predetermined time from the time of initiation of the encrypted communications. The receiving node receives the flag signal and starts to generate the running key used for setting the bit discrimination threshold value at the time obtained by subtracting the amount of delay time of the bit discrimination threshold signal that has been generated in the receiving node from the predetermined time. Then, the synchronization is established between the position of the running key that has been used for encryption in the transmitting node and the position of the running key used for setting the bit discrimination threshold value in the receiving node. In this example, the predetermined time is preferably set into predetermined bits.

Furthermore, the present invention may be configured as an encryption communication system.

Specifically, the encryption communication system is configured such that data is encrypted based on a shared key using a multi-valued signal and transmitted from a transmitting station, and that the data is received and decrypted based on the shared key in a receiving station. In the encryption communication system, the transmitting station has: first key generation means for generating a running key from the shared key; means for generating data to be transmitted as a N-bit multi-valued signal; an optical modulator for outputting a signal whose optical intensity basis has been changed by the N-bit multi-valued signal generated by the data generation means; and a logical processing unit for controlling the first key generation means to generate a multi-valued signal having a predetermined fixed pattern.

Also, in the encryption communication system, the receiving station has: second key generation means for generating a running key from the shared key; means for generating a N-bit multi-valued signal in accordance with the running key that has been generated by the second key generation means; and a logical processing unit. The logical processing unit generates a bit discrimination threshold signal that allows for bit discrimination and has a fixed length. After that, the logical processing unit shifts bit by bit the phase of the bit discrimination threshold signal while monitoring the bit discrimination with respect to the signal that has the predetermined fixed pattern and that is to be received. Then, the logical processing unit sets the phase of the bit discrimination threshold signal when the phase of the signal that has the predetermined fixed pattern and that is to be received matches the phase of the bit discrimination threshold signal.

Also, the present invention may be understood as a receiving device having a characteristic configuration.

Specifically, the receiving device receives data that has been encrypted with a running key generated from the shared key using a multi-valued signal and that has been transmitted. After receiving the data, the receiving device decrypts the data using the running key. The receiving device has: key generation means for generating the running key from the shared key; means for generating the received data as a N-bit multi-valued signal in accordance with the running key generated by the key generation means; and a logical processing unit. The logical processing unit generates a bit discrimination threshold signal that allows for bit discrimination and has a fixed length. After that, the logical processing unit shifts bit by bit the phase of the bit discrimination threshold signal while monitoring the bit discrimination with respect to the signal that has the predetermined fixed pattern and that is to be received. Then, the logical processing unit sets the phase of the bit discrimination threshold signal when the phase of the signal that has the predetermined fixed pattern and that is to be received matches the phase of the bit discrimination threshold signal. The receiving device performs synchronization of the running key in accordance with the phase that has been set by the logical processing unit between the receiving device and a transmitting device that has transmitted the data.

In still another preferable embodiment of the present invention, the logical processing unit changes a part of the phase of the bit discrimination threshold signal while monitoring the change of the bit discrimination threshold signal during the reception of the signals that each have the predetermined fixed pattern and that have been repeatedly transmitted. Then, the logical processing unit sets an amount of delay of the bit discrimination threshold signal generated in the receiving node in accordance with a result of the monitoring. Accordingly, the synchronization of the running key is performed along with the reception of the shared key.

In addition, the logical processing unit preferably receives a flag signal (running key synchronization signal) that has been transmitted before a predetermined time from the time of initiation of encrypted communications, starts to generate the running key used for setting a bit discrimination threshold value at the time obtained by subtracting the amount of delay of the bit discrimination threshold signal that has been generated in the receiving node from a predetermined time. Then, the synchronization is established between the position of the running key that has been used for the encryption in the transmitting node and the position of the running key used for setting the bit discrimination threshold value in the receiving node.

Furthermore, the present invention may be understood as a method for communications encrypted with a shared key, which will be described below. Specifically, the method for communications encrypted with a shared key using a multi-valued signal comprises the steps of: transmitting a signal used for byte alignment of a binary clock (hereinafter referred to as a binary clock byte alignment signal) from a transmitting node; repeatedly transmitting a multi-valued signal (hereinafter referred to as a multi-valued fixed pattern signal) having a predetermined fixed pattern from the transmitting node; receiving the transmitted binary clock byte alignment signal in a receiving node; shifting bit by bit the phase of a threshold signal (multi-valued fixed pattern signal identification threshold signal) used to identify the multi-valued fixed pattern signal while attempting to receive the multi-valued fixed pattern signals until synchronization is established between the multi-valued fixed pattern signal and the multi-valued fixed pattern signal identification threshold signal; and setting, in the receiving node, the phase of the multi-valued fixed pattern identification threshold signal when the phase of the multi-valued fixed pattern signal matches the phase of the multi-valued fixed pattern identification threshold signal and performing synchronization for the shared key encryption in accordance with the phase that has been set.

In still another preferable embodiment of the present invention, the method for encrypted communications with a shared key using a multi-valued signal further comprises the steps of: inserting a threshold signal string (receiving device internal delay determination threshold signal) so as to change the multi-valued fixed pattern signal identification threshold signal; and detecting the time to reverse a part of a value to be discriminated so as to set the delay time t1 of the bit discrimination threshold signal generated in the receiving node in accordance with the result of the detection.

In still another preferable embodiment of the present invention, the method for encrypted communications with a shared key using a multi-valued signal further comprises the steps of: transmitting a flag signal (running key synchronization signal) for initiating the running key in the transmitting node; after transmitting the flag signal and after a predetermined time, starting to use the running key to initiate encrypted communications; after receiving the running key synchronization signal, generating the running key for the receiving node at the time obtained by subtracting the time t1 from the predetermined time in the receiving node; decrypting encrypted data that has been received using the generated running key while maintaining the synchronization of the running key between the transmitting node and the receiving node.

In still another preferable embodiment of the present invention, the method for communications further comprises the steps of: transmitting a signal (hereinafter referred to as a binary clock byte alignment signal end signal) that indicates an end of the binary clock byte alignment signal in the transmitting node; and receiving the binary clock byte alignment signal end signal and setting a multi-valued fixed pattern signal identification threshold value using the reception of the binary clock byte alignment signal end signal as a trigger.

More preferably, if the synchronization of the multi-valued fixed pattern signal identification threshold signal with the multi-valued fixed pattern signal, the setting of the delay time t1, or the synchronization of the running key between the two nodes fails, the receiving node transmits an alarm signal to the transmitting node to retry the failed operation.

According to the present invention, in communications encrypted with a shared key using a multi-valued signal based on Y-00 Protocol, timing for synchronization between transmission data and a bit discrimination threshold value is extracted by using a signal that has a predetermined pattern and that is included in communication data so as to synchronize a running key between a transmitting node and a receiving node.

BRIEF DESCRIPTION OF THE DRAWINGS

FIG. 3 is a flowchart showing steps of a synchronization process in a transmitting node, according to the embodiment.

FIG. 4 is a flowchart showing steps of the synchronization process in a receiving node, according to the embodiment.

FIG. 5 is a timing chart showing communication signals according to the embodiment.

FIG. 6 is a flowchart showing steps of a synchronization process in a receiving node, according to another embodiment.

BEST MODE FOR CARRYING OUT THE INVENTION

An embodiment of the present invention will be described below with reference to accompanying drawings.

Figure 1:
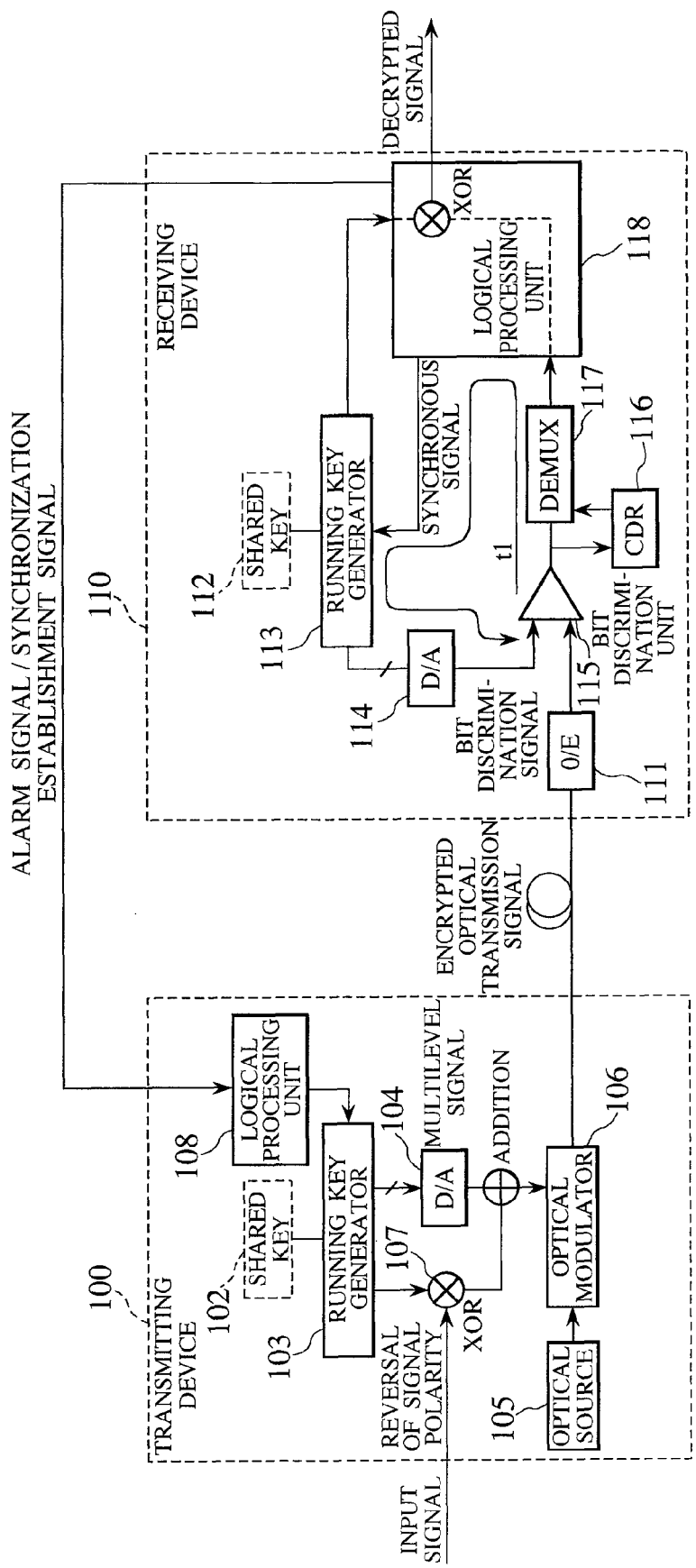
FIG. 1 is a diagram showing the configurations of a transmitting device and a receiving device used in encrypted communications with a shared key, according to an embodiment of the present invention.

FIG. 1 shows the configurations of a transmitting device and a receiving device according to the embodiment of the present invention. A transmitting device 100 is a Y-00 quantum cryptographic communication transmitting device, and A receiving device 110 is a Y-00 quantum cryptographic communication receiving device.

For the transmitting device 100, a shared key 102 is bit string data of about 100 bits and is stored in, e.g., a memory (not shown). A running key generator 103 is, e.g., a random number generator and sequentially generates random numbers using the bit string data of the shared key 102 as an initial value. The generated random numbers are used as a running key for encryption. The running key is transmitted to an XOR (exclusive OR) 107 and a D/A modulator 104. The XOR 107 reverses the polarity of an input signal based on the running key. The reversal of polarity is used to control encryption of the binary input signal. The D/A modulator 104 generates a multilevel analog signal (hereinafter referred to as a multilevel signal) based on the running key that is sequentially generated. The input signal whose polarity has been reversed is added to the multilevel signal that has been generated based on the running key so as to generate a multi-valued signal.

Figure 2:
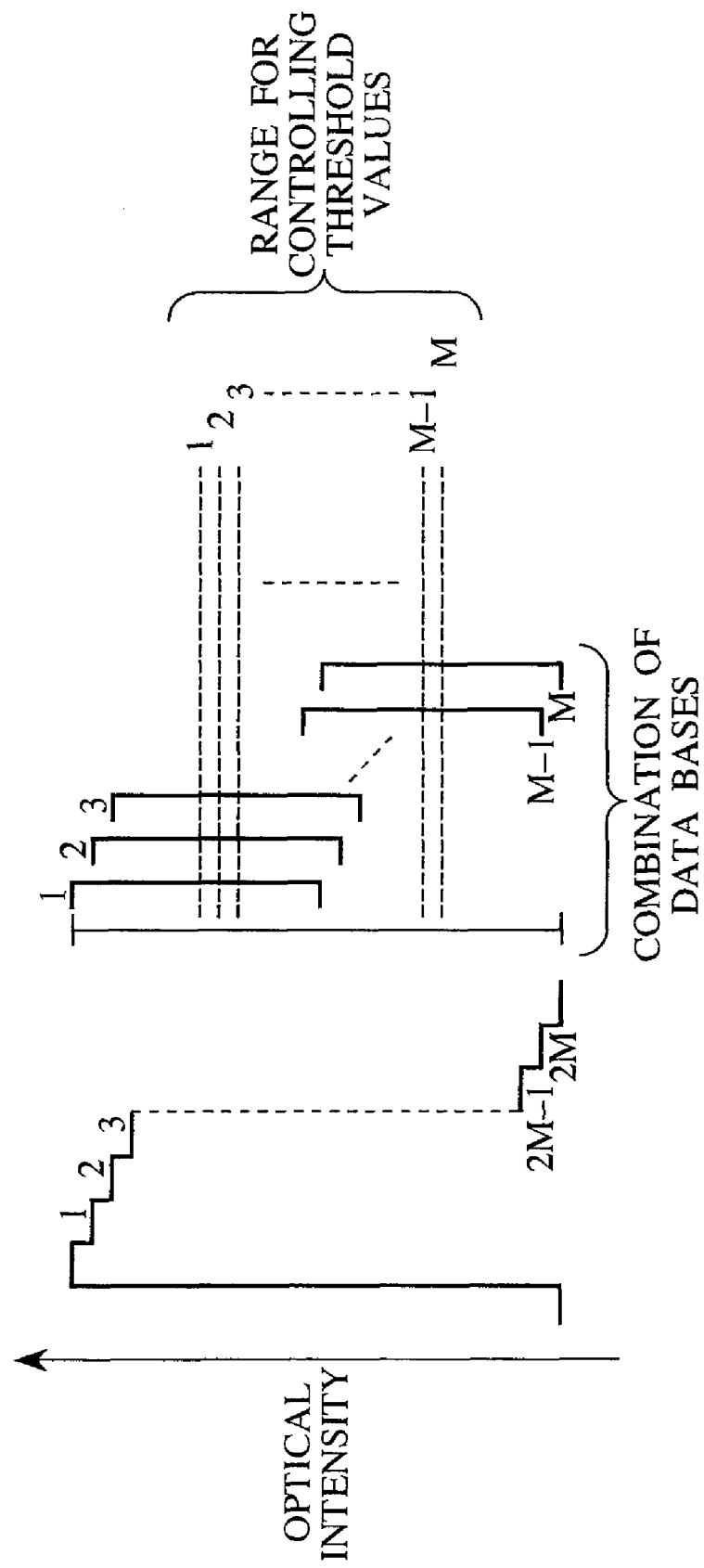
FIG. 2 is a diagram of a data basis structure used in encrypted communications with a shared key according to the embodiment.

On the other hand, an optical source 105 such as a semiconductor laser outputs an optical signal. The optical signal is modulated by an optical modulator 106. In this case, the optical intensity level of the optical signal is selected by using the multilevel signal, and the optical signal is output as a multi-valued optical signal. This signal is a Y-00 encrypted optical signal. As shown in FIG. 2, the signal has 2M types of values and is discriminated into binary values by using M types of threshold values.

A logical processing unit 108 is configured by using a hardware circuit and has a characteristic function in the present embodiment. To be more specific, the logical processing unit 108 controls alignment of the position of the running key. Also, the logical processing unit 108 controls a retry when receiving an alarm signal and a synchronization establishment signal transmitted from the receiving device 110. In addition, the logical processing unit 108 maintains a multi-valued fixed pattern and provides it to the running key generator 103 so that a multi-valued signal having a fixed pattern is generated.

Next, a running key generator 113 that is formed of a random number generator and provided in the receiving device 110 is the same as the random number generator provided in the transmitting device 100. Similarly to the configuration of the transmitting device 100, the running key generator 113 sequentially generates a running key used for decryption using a shared key 112 as an initial value. The shared key 112 is stored in a memory (not shown). The generated running key is provided to a D/A modulator 114 and a logical processing unit 118. The D/A modulator 114 generates a bit discrimination threshold signal (multilevel analog signal) in accordance with the running key. The running key that is provided to the logical processing unit 118 is used to reverse the polarity of data received.

For the receiving device 110, an optoelectric converter (O/E) 111 converts the optical modulation signal that has been received into an electrical signal. A comparator 115 compares the bit discrimination threshold signal generated by the D/A modulator 114 with a received signal so as to discriminate the received data (optoelectrically converted signal) into binary values. A clock data recovery (CDR) unit 116 extracts a clock from a transmitted signal that is to be received. A demultiplexer (DEMUX) 117 converts binary data to be input into parallel data based on a processing bit rate of the logical processing unit 118 so as to reduce the frequency. For example, serial data to be input is converted into parallel data (1: n), where n is an integer (e.g., 16).

The logical processing unit 118 is configured by using a hardware circuit including XOR (exclusive OR) logic and decrypts the data that has been parallelized by the running key. With the decryption, the original data is restored. Also, the logical processing unit 118 monitors whether the data that has been discriminated into binary values is correct and whether the running key is synchronized with the data that has been discriminated into binary values, which is one of processing specific to the present embodiment. In addition, the logical processing unit 118 performs the following processing operations as shown in FIG. 4: the synchronization of the multi-valued fixed pattern signal with the multi-valued fixed pattern signal identification threshold signal (402); delay synchronization (403); and processing for calculating an amount of delay of the bit discrimination threshold signal in order to generate the running key. Furthermore, as shown in FIG. 6, the logical processing unit 118 monitors whether an error is present. If an error exists, the logical processing unit 118 notifies the logical processing unit 108 provided in the transmitting device 100 of the presence of the error.

As described above, the receiving device 110 generates a bit discrimination threshold signal in accordance with a running key for decryption and performs bit discrimination for an electrical signal that has been optoelectrically converted. During encrypted communications, since bit discrimination is performed in the receiving device 110 before data is logically processed, it is necessary that the bit discrimination unit (comparator 115) synchronize a signal received through encrypted transmission with the bit discrimination threshold signal having M types of values.

Next, a description will be made of the synchronization process performed in a transmitting/receiving system including a transmitting device and a receiving device as described above, with reference to a time chart shown in FIG. 5 if required.

In the case where a data signal is synchronized with a clock extracted from an encrypted optical transmission signal (received signal) by the CDR 116 and is parallelized by the DEMUX 117 based on the processing bit rate of the logical processing unit 118, the transmitting device 100 transmits a binary clock byte alignment signal (which is "A" portion shown in FIG. 5) before transmitting encrypted data. The receiving device 110 performs parallel bit alignment in accordance with the binary clock byte alignment signal (bit sequence alignment from the most significant bit (MSB) to the least significant bit (LSB)).

In order to receive an encrypted multi-valued signal, the bit discrimination unit (comparator 115), which is an upstream unit of the logical processing unit 118, is required to synchronize the electrical signal that has been optoelectrically converted with the bit discrimination threshold signal. To perform the synchronization, it is necessary that the delay time t1 (e.g., number of bits) of the bit discrimination threshold signal be detected in the receiving device 110. The logical processing unit 118 operates the running key in view of the delay time t1.

In order to detect the delay time t1 of the bit discrimination threshold signal in the receiving device 110, a multi-valued signal is required to be received so that a predetermined value of the multi-valued signal is discriminated. In order to discriminate the value, the bit discrimination threshold value is changed so as to change the value to be discriminated during receiving the multi-valued signal, and the time (number of bits) required to completely change the value to be discriminated is calculated.

For the above operations, the transmitting device 100 repeatedly transmits a multi-valued signal (hereinafter referred to as a multi-valued fixed pattern signal (which is "C" portion shown in FIG. 5)) having a predetermined length and a fixed pattern as a preamble signal before transmitting an encrypted transmission signal (which is "E" portion shown in FIG. 5)). The receiving device 110 shifts bit by bit the phase of a threshold pattern (hereinafter referred to as a multi-valued fixed pattern signal identification threshold signal (which is "P" portion shown in FIG. 5) used to receive the multi-valued fixed pattern signal while the logical processing unit 118 monitors the value to be discriminated (for bit discrimination). The pattern of the multi-valued fixed pattern signal and that of the multi-valued fixed pattern signal identification threshold signal are designed so that a predetermined value to be discriminated can be detected when the phases of both of the signals coincide with each other. Accordingly, the phase of the multi-valued fixed pattern signal identification threshold signal is set when the phases coincide with each other. With the processes before and including the above process, a multi-valued signal can be received if the signal has a fixed length, and the synchronization process for the multi-valued signal ends. It should be noted that the abovementioned multi-valued fixed pattern signal identification threshold signal P is generated by using the reception of the binary clock byte alignment signal end signal as a trigger, as shown in FIG. 5.

At the end of or before the synchronization process for the multi-valued signal, if the length of the multi-valued fixed pattern signal is shorter in time than the delay time t1, the delay time t1 may not be detected accurately. In order to obtain an accurate delay time, a threshold signal (receiving device internal delay determination threshold signal (which is "Q" portion shown in FIG. 5)) used to determine a delay of the bit discrimination threshold signal is generated. The receiving device internal delay determination threshold signal is such that some of polarities of the value to be discriminated, which are being monitored, are reversed. Then, the time (e.g., number of bits) required to reverse some of the polarities of the value to be discriminated is detected. This time will be the value t1. The process is called delay synchronization since it is performed to measure an amount of the delay of the bit discrimination threshold signal in the receiving device 110.

After that, the transmitting device 100 transmits a flag signal (running key synchronization signal (which is "D" portion shown in FIG. 5) that is generated by changing a part of the multi-valued fixed pattern signal and that is used to initiate a running key. After transmitting the flag signal and after a time (which is "t2" portion shown in FIG. 5) for a predetermined number of bits, the transmitting device 100 starts to generate the running key and then starts to encrypt a communication signal. Accordingly, encrypted communications are initiated in accordance with the running key (which is "E" portion shown in FIG. 5).

On the other hand, after the receiving device 110 receives the running key synchronization signal, it generates the running key at the time obtained by subtracting the time t1 from the time t2 for the predetermined number of bits and starts to use the running key. In other words, the receiving device 110 starts to use the running key after the time obtained by subtracting the delay time t1 (of the bit discrimination threshold signal generated in the receiving device 110) from the time t2 for the predetermined number of bits.

With the above operations, the signal that has been encrypted by using the running key and transmitted by the transmitting device 100 is received by the bit discrimination unit (comparator 115) provided in the receiving device 110. In this case, in the receiving device 110, the bit discrimination threshold signal, for which the running key has been used and which is associated with the transmitted signal, is added to the bit discrimination unit. This allows the receiving device 110 to discriminate, into binary values, the signal that has been encrypted and transmitted. Accordingly, the synchronization of the running key is performed between the transmitting device 100 and the receiving device 110.

Next, a description will be made of operations for the encrypted communications and operations for the synchronization process in the encrypted communications with reference to FIGS. 3 and 4.

First, the transmitting device 100 transmits a binary clock byte alignment signal (which is "A" portion shown in FIG. 5) (301). The receiving device 110 receives this signal as a pattern for clock synchronization and byte synchronization (401). This pattern is used for alignment to bit sequence when the DEMUX 117 performs parallel processing.

After that, the transmitting device 110 transmits a binary clock byte alignment signal end signal (which is "B" portion shown in FIG. 5) (302), and sequentially transmits a multi-valued fixed pattern signal (which is "C" portion shown in FIG. 5) (303). The multi-valued fixed pattern signal is a multi-valued signal string having a fixed length and is predetermined between the transmitting device 100 and the receiving device 110. The transmitting device 100 repeatedly transmits the multi-valued fixed pattern signal. As a result, a plurality of the multi-valued fixed pattern signals are transmitted.

In order to receive the multi-valued fixed pattern signals that has been sequentially transmitted, the receiving device 110 repeatedly uses multi-valued fixed pattern signal identification threshold signals ("P" portion shown in FIG. 5) each having the same bit length for bit discrimination, and attempts to receive the multi-valued fixed pattern signals (402). The multi-valued fixed pattern signal and the multi-valued pattern signal identification threshold signal are designed such that when they are synchronized with each other, a predetermined discrimination value string is obtained. The receiving device 110 attempts to receive the multi-valued fixed pattern signal while shifting, bit by bit, the phase of the multi-valued fixed pattern signal identification threshold signal until both of the signals are synchronized with each other. This scheme makes it possible to detect a bit phase which allows for the synchronization by shifting at least bits corresponding to the bit length of the multi-valued fixed pattern signal (=the bit length of the multi-valued fixed pattern signal identification threshold signal). With the processes before and including this process, a multi-valued signal can be received if it has a fixed length.

Then, the receiving device 110 measures and sets the delay time t1 of the bit discrimination threshold signal (403). If the length of the multi-valued fixed pattern signal is longer in time than the delay time t1 in the previous step, the delay time t1 is regarded to have been already adjusted. On the other hand, if the length of the multi-valued fixed pattern signal is shorter in time than the delay time t1, the multi-valued fixed pattern signal may be shifted by a few or more slots thereof. Thus, it is necessary that the signal be adjusted. The transmitting device 100 sequentially transmits the multi-valued fixed pattern signal. In the receiving device 110, a part of the multi-valued fixed pattern signal identification threshold signal is changed so as to insert a threshold signal string (hereinafter referred to as a receiving device internal delay determination threshold signal). As a result of the insertion, the value to be discriminated is reversed. Then, the receiving device 110 detects the value t1 by measuring the time (number of bits) required to reverse the value to be discriminated. The value t1 obtained when the value to be discriminated is completely reserved is the delay time of the bit discrimination threshold signal generated in the receiving device 110. After this, the value t1 is set. The above operations are for the delay synchronization (403) as shown in FIG. 4.

Next, the transmitting device 100 transmits a flag signal (running key synchronization signal) used to initiate the running key (304). After transmitting the flag signal and after the time for a predetermined number of bits, the transmitting device 100 starts to use the running key and initiates encrypted communications (305). In other words, the transmitting device 100 uses the generated running key to encrypt a signal that is to be transmitted and transmits the encrypted signal.

On the other hand, the receiving device 110 receives the running key synchronization signal. After the reception, the receiving device 110 initiates the running key of the receiving device 110 at the time obtained by subtracting the time t1 from the time for the predetermined number of bits (404, 405). With the above operations, the bit discrimination unit (comparator 115) provided in the receiving device 110 receives the signal that has been encrypted by using the running key and that has been transmitted from the transmitting device 100. In this case, in the receiving device 110, the bit discrimination threshold signal, for which the running key has been used and which is associated with the transmitted signal, is added to the bit discrimination unit. This allows the receiving device 110 to discriminate, into binary values, the signal that has been encrypted and transmitted. Accordingly, the synchronization of the running key is performed between the transmitting device 110 and the receiving device 110. After that, the encrypted data that has been received is decrypted by using the running key generated in the receiving device 110 while the synchronization is maintained (406).

Next, another embodiment will be described below with reference to FIG. 6.

A synchronization process in the present embodiment is modified by using the synchronization process shown in FIG. 4. Specifically, if the synchronization of the multi-valued fixed pattern signal identification threshold signal with the multi-valued fixed pattern signal (402), the measurement and setting of the delay time t1 (403), or the synchronization of the running key between the transmitting node and the receiving node (404) fails, the logical processing unit 118 transmits an alarm signal to the transmitting device 100. Then, the process in the transmitting device 100 and that in the receiving device 110 return to the previous step so as to retry the synchronization process.

What is claimed is:

1. A method for synchronization of a running key used for encryption data to be transmitted and decryption data received, the method comprising:

generating, by a running key generator, the running key from a shared key, the shared key being previously stored in a transmitting node;

generating transmission data as an N-bit multi-valued signal in accordance with the running key that has been generated by the running key generator;

outputting a signal having an optical intensity basis that is changed by using the multi-valued signal;

controlling the running key generator to generate a multi-valued fixed pattern signal having a predetermined fixed pattern;

transmitting, from the transmitting node, the multi-valued fixed pattern signal having the predetermined fixed pattern before transmitting the multi-valued signal, which is encrypted by using the running key;

receiving, in a receiving node, the multi-valued fixed pattern signal transmitted from the transmitting node before receiving the multi-valued signal encrypted by using the running key;

generating a bit discrimination threshold signal that allows for bit discrimination and that has a fixed length;

shifting bit by bit the phase of the bit discrimination threshold signal while monitoring the bit discrimination with respect to the multi-valued fixed pattern signal that is to be received;

setting the phase of the bit discrimination threshold signal when the phase of the multi-valued fixed pattern signal matches the phase of the bit discrimination threshold signal; and performing synchronization of the running key between the receiving node and the transmitting node in accordance with the phase that has been set, wherein the synchronized running key is generated from a shared key previously stored in the receiving node, wherein the shared key is the same as a shared key of the transmitting node, and wherein the received multi-valued signal is decrypted by the synchronized running key.

2. The method for synchronization according to claim 1, further comprising:

repeatedly transmitting, by the transmitting node, the multi-valued fixed pattern signal a plurality of times; and receiving, by the receiving node, a plurality of the multi-valued fixed pattern signals, and sequentially shifting, by the receiving node, the plurality of the multi-valued fixed pattern signals bit by bit, while performing the bit discrimination.

3. The method for synchronization according to claim 1, further comprising:

changing, by the receiving node, a part of the bit discrimination threshold signal while monitoring the change of the bit discrimination threshold signal during the reception of the multi-valued fixed pattern signals that has been repeatedly transmitted;

setting, by the receiving node, an amount of delay of the bit discrimination threshold signal in accordance with a result of the monitoring; and performing, by the receiving node, generation of the synchronized running key along with the reception of the multi-valued signal encrypted.

4. The method for synchronization according to claim 1, further comprising:

transmitting, by the transmitting node, a flag signal (running key synchronization signal) before a predetermined time from the time of initiation of encrypted communications in order to notify the receiving node of the position of a running key used for the encrypted communications;

receiving, by the receiving node, the flag signal, and starting to generate, by the receiving node, the running key used for setting a bit discrimination threshold value at the time obtained by subtracting an amount of delay of the bit discrimination threshold signal generated in the receiving node from a predetermined time; and establishing synchronization between the position of the running key used for encryption and the position of the running key used for setting the bit discrimination threshold value for the receiving node.

5. The method for synchronization according to claim 4, further comprising:

setting the predetermined time using a predetermined number of bits.

6. The method for synchronization according to claim 1, further comprising:

transmitting a binary clock byte alignment signal from the transmitting node;

receiving the transmitted binary clock byte alignment signal in the receiving node;

in the receiving node, shifting bit by bit a multi-valued fixed pattern signal identification threshold signal, and attempting to receive the multi-valued fixed pattern signal until synchronization is established between the multi-valued fixed pattern signal identification threshold signal and the multi-valued fixed pattern signal;

in the receiving node, setting the phase of the multi-valued fixed pattern signal identification threshold signal when the phase of the multi-valued fixed pattern signal matches the phase of the multi-valued fixed pattern signal identification threshold signal, and performing the synchronization for encryption using the shared key in accordance with the phase that has been set.

7. The method for synchronization according to claim 1, further comprising:

inserting a threshold signal string (receiving device internal delay determination threshold signal), and changing the multi-valued fixed pattern signal identification threshold signal in the receiving node is based on the inserted threshold signal string; and detecting the time required to reverse a value to be discriminated, and setting a delay time t1 of a bit discrimination threshold value in the receiving node based on a result of the detection.

8. The method for synchronization according to claim 1, further comprising:

transmitting a flag signal (running key synchronization signal) for initiating the running key from the transmitting node;

after transmitting the flag signal and after a predetermined time, starting to use the running key, thereby initiating encrypted communications;

after receiving the running key synchronization signal in the receiving node, generating the running key at the time obtained by subtracting the delay time t1 from the predetermined time in the receiving node; and decrypting encrypted data that has been received using the running key that has been generated in the receiving node while maintaining the synchronization of the running key in accordance with the phase that has been set between the transmitting node and the receiving node.

9. The method for synchronization according to claim 6, further comprising:
   transmitting a binary clock byte alignment signal end signal from the transmitting node; and
   receiving the binary clock byte alignment signal end signal in the receiving node and setting the multi-valued fixed pattern signal identification threshold value using the reception of the binary clock byte alignment signal end signal as a trigger.

10. The method for synchronization according to claim 7, further comprising:
    if the synchronization of the multi-valued fixed pattern signal identification threshold signal with the multi-valued fixed pattern signal, the setting of the delay time t1, or the synchronization of the running key between the transmitting node and the receiving node fails, transmitting an alarm signal from the receiving node to the transmitting node, and retrying the failed operation.

11. An encryption communication system in which a transmitting station encrypts data based on a shared key using a multi-valued signal and transmits the encrypted data, and in which a receiving station receives the encrypted data and decrypts the encrypted data based on the shared key,
    wherein the transmitting station comprises:
    first key generation means for generating a running key from the shared key;
    means for generating transmission data as an N-bit multi-valued signal in accordance with the running key that has been generated by the first key generation means;
    an optical modulator for outputting a signal whose optical intensity basis is changed by using the multi-valued signal that has been generated by the multi-valued signal generation means; and
    a logical processing unit for controlling the first key generation means to generate a multi-valued signal (multi-valued fixed pattern signal) having a predetermined fixed pattern; and
    wherein the receiving station comprises:
    second key generation means for generating the running key from the shared key;
    means for generating received data as an N-bit multi-valued signal in accordance with the running key that has been generated by the second generation means; and
    a logical processing unit for generating a bit discrimination threshold signal that allows for bit discrimination and has a fixed length, shifting bit by bit the phase of the bit discrimination threshold signal while monitoring bit discrimination with respect to the multi-valued fixed pattern signal that is to be received, and setting the phase of the bit discrimination threshold signal when the phase of the multi-valued fixed pattern signal matches the phase of the bit discrimination threshold signal,
    wherein synchronization of the running key is performed in accordance with the phase that has been set by the logical processing unit between the transmitting station and the receiving station.

12. A receiving device which receives data that has been encrypted by using a running key generated from a shared key using a multi-valued signal and that has been transmitted from a transmitting device, and which decrypts the encrypted data using the running key, the receiving device comprising:
    a running key generator generating the running key from the shared key,
    wherein the shared key is the same as a shared key in the transmitting device;
    a D/A (digital-to-analog) modulator generating a bit discrimination threshold signal in accordance with the running key generated by the running key generator;
    a comparator comparing the bit discrimination threshold signal generated by the D/A modulator with a received signal,
    wherein the received data is discriminated into binary values using a result of the step of comparing; and
    a logical processing unit for generating a bit discrimination threshold signal that allows for bit discrimination and has a fixed length, shifting bit by bit the phase of the bit discrimination threshold signal, monitoring the bit discrimination threshold signal with respect to a fixed pattern signal included in the received data before generating the running key by the running key generator, and setting the phase of the bit discrimination threshold signal when the phase of the fixed pattern signal matches the phase of the bit discrimination threshold signal,
    wherein synchronization of the running key is performed in accordance with the phase that has been set by the logical processing unit between the receiving device and the transmitting device, and the received data is decrypted by the running key that has been synchronized.

13. The receiving device according to claim 12, wherein the logical processing unit changes a part of the bit discrimination threshold signal during the reception of the fixed pattern signals that have been repeatedly transmitted from the transmitting device while monitoring the change of the bit discrimination threshold signal, sets an amount of delay of the bit discrimination threshold signal for the receiving device in accordance with a result of the monitoring, and performs the synchronization of the running key.

14. The receiving device according to claim 12,
    wherein the logical processing unit receives a flag signal (running key synchronization signal) that is transmitted before a predetermined time from the time of initiation of encrypted communications, starts to generate a running key used for setting a value to be discriminated at the time obtained by subtracting the amount of delay of the generated bit discrimination threshold signal from the predetermined time, establishes synchronization between the position of the running key used for the encryption in a transmitting device and the position of the running key used for setting the discrimination threshold value of the receiving device.

15. The receiving device according to claim 12, wherein the a running key generator is a random number generator that generates random numbers using bit string data of the shared key as an initial value.

* * * * *